Aug. 9, 1960     J. FRASER     2,948,300

FLOW CONTROL UNIT

Filed April 23, 1958     2 Sheets-Sheet 1

INVENTOR
JAMES FRASER

BY Holcombe, Wetherill & Brisebois
ATTORNEYS

Aug. 9, 1960 J. FRASER 2,948,300
FLOW CONTROL UNIT
Filed April 23, 1958 2 Sheets-Sheet 2

INVENTOR
JAMES FRASER

BY Holcombe, Wetherill & Brisbois
ATTORNEYS

United States Patent Office 2,948,300
Patented Aug. 9, 1960

2,948,300

FLOW CONTROL UNIT

James Fraser, Wilmington, Del., assignor to Speakman Company

Filed Apr. 23, 1958, Ser. No. 730,461

8 Claims. (Cl. 138—45)

This invention relates to a fluid controlled device, and more in particular to a device for controlling the flow of water in plumbing installations.

Heretofore, many devices have been made to control the flow of fluids, particularly under high pressure, where the increase in pressure has deformed radially an elastic disk or washer having a central opening therein, so as to decrease the effective cross sectional area of its opening. Also various devices have been employed which control the flow of fluids by means of an elastic disk having openings under the disk which close as the pressure increases, thereby limiting the flow with increased pressure. Some of these devices are applicable to the usual water volume control found in the average home, or in institutions, such as hospitals, schools, etc., but most of these have been devised for use in controlling fluid flow in carburetor systems.

The present application has for its object the production of a device that will control the flow of water in the usual plumbing installations.

It is a still further object of this invention to provide a volume control that varies with the pressure to reduce the volume as the pressure increases, but will never completely cut off the water, no matter how high the pressure goes.

It is also an object of this invention to provide a device that is not deformed radially towards a central opening as these devices are very sensitive to variations in rubber hardness.

The various features of novelty which characterize this invention are pointed out with particularity in the claims annexed to and forming part of this specification. For a better understanding of the invention, however, its advantages, and specific objects obtained with its use, reference should be had to the accompanying drawings and descriptive matter in which have been illustrated and described the preferred embodiment of the invention.

In the drawings.

Like numerals refer to like parts throughout the several figures.

Figure 1:
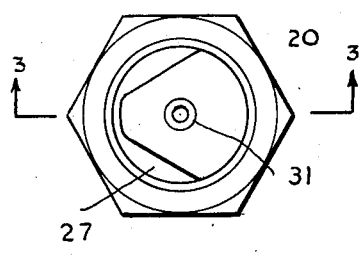
Figure 1 is a plan view of the flow control device mounted in a coupling.
Figure 4:
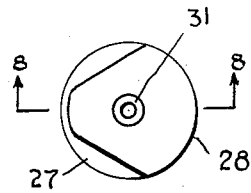
Fig. 4 is a plan view of the device.
Figure 2:
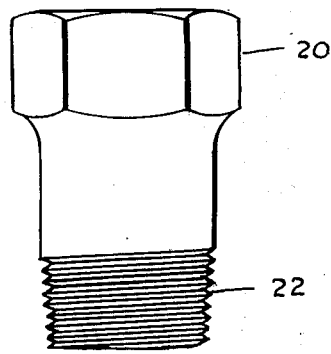
Fig. 2 is a side view of the device as shown in Fig. 1.
Figure 5:
Fig. 5 is a side view of the device.
Figure 6:
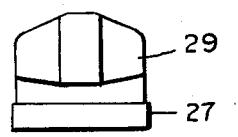
Fig. 6 is an end view of the device.
Figure 3:
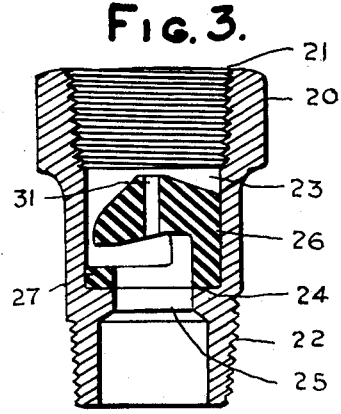
Fig. 3 is a sectional view on the line 3—3 of Fig. 1.
Figure 7:
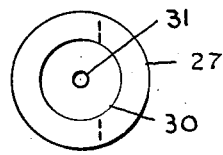
Fig. 7 is a bottom view of the device.
Figure 8:
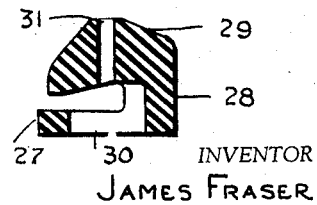
Fig. 8 is a sectional view on line 8—8 of Fig. 4.
Figure 9:
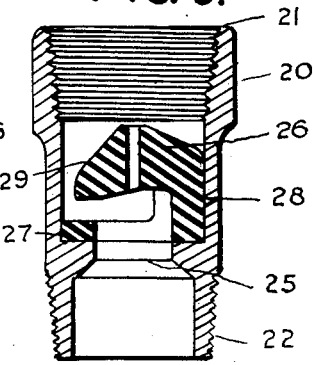
Fig. 9 is similar to Fig. 3 showing the position assumed by the rubber unit under 15 pounds pressure.
Figure 10:
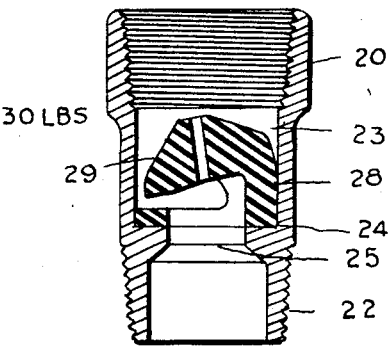
Fig. 10 is similar to Fig. 9 showing the position assumed by the rubber unit under 30 pounds pressure.
Figure 11:
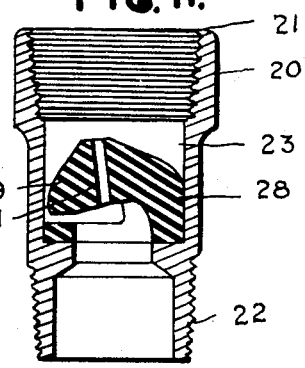
Fig. 11 is similar to Fig. 9 showing the position assumed by the rubber unit under 45 pounds pressure.

In the drawings there has been shown a flow control device for controlling the delivery volume of water through various changes of pressure. This has a general broad application and has not been illustrated in connection with any particular fixture. It is illustrated as being placed in an adapter which may be used in any water line. This adapter 20, shown in Figs. 1, 2, 3 and 9 to 13 inclusive is provided with female threads 21 on the upper end and male threads 22 on the lower end to facilitate its interconnection into a water supply system. This adapter is provided with a passageway 23 extending therethrough. This passageway has a shoulder 24 on the walls thereof which has a central opening 25 therein. Seated on this shoulder 24 is a rubber flow control unit 26 shown in Figs. 4 to 8 inclusive. This unit has a base 27. Extending vertically from this base on one side thereof is a neck portion 28 and supported on the neck portion and overlying the base is a head portion 29. The base is provided with a central opening 30 which is at least as large as the central opening 25 of the shoulder 24. This forms part of the water passageway through the adapter. The head portion 29 is provided with a small axial opening 31 therethrough.

Figure 12:
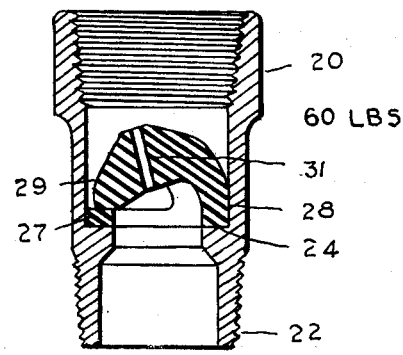
Fig. 12 is similar to Fig. 9 showing the position assumed by the rubber unit under 60 pounds pressure.
Figure 13:
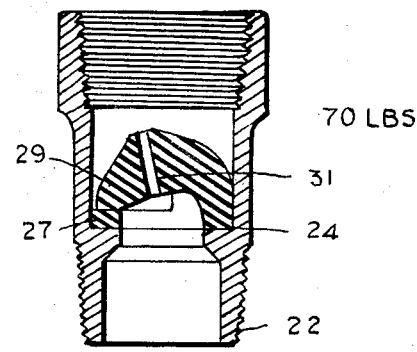
Fig. 13 is similar to Fig. 9 showing the position assumed by the rubber unit under 70 pounds pressure.
Figure 14:
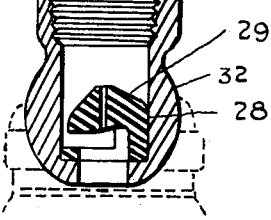
Fig. 14 is a view in section drawn on a smaller scale than Fig. 13, showing the device mounted in the ball joint of a shower head.

In use the adapter 20 has the rubber unit 26 placed therein so that the base portion 27 surrounds the opening 25 in the shoulder in the adapter and fits snugly against the side walls thereof. The head portion 29 is supported by the flexible neck portion 28 and assumes the position shown in Fig. 9 when water flows from the top to the bottom of the adapter 20 under a pressure of fifteen pounds per square inch. When the water pressure increases to thirty pounds the unit assumes the position shown in Fig. 10, and the neck portion 28 flexes and allows the head portion 29 to assume the position shown. This decreases the passageway and allows the same volume of water to flow therethrough in the same length of time as was allowed to pass at fifteen pounds pressure, shown in Fig. 9. When the pressure is increased to forty-five pounds per square inch the head portion assumes the position shown in Fig. 11 and further decreases the effective area of the conduit and still allows the same volume of water to flow through in the same length of time as it did in the condition shown in Fig. 9. When the pressure is further increased to sixty pounds per square inch the head portion 29 touches the base portion 27 as shown in Fig. 12 and still delivers the same volume of water. When the pressure is increased to seventy pounds per square inch as shown in Fig. 13 the head portion 29 flexes downwardly and contacts the base portion 27 for a greater distance and still further reduces the effective opening through which the water may flow, but still maintains the original volume delivered in a given length of time. It will be readily seen that this particular type of device does not depend on any radial movement of the rubber unit but does depend on a flexing of the supporting portion 28 acting under the force exerted by the flow of water against the head portion 29. The axial opening 31 through the head 29 allows for the constant delivery of a minimum amount of water under any pressure as the rubber head 29 has more of a tendency to flex in supporting neck 38 than it does to move radially to close the opening 31.

A specific application of this unit is shown in Fig. 13 where it is inserted in the ball joint 32 of a shower head.

While in the above description a rubber unit having a durometer hardness of about 80 is illustrated under various water pressures, any elastomeric material may be used such as neoprene, butadiene and the like.

While in accordance with the provisions of the statute, the best forms of embodiment of this invention have been illustrated and described, it will be apparent to those skilled in the art that changes may be made in the forms of the apparatus disclosed without departing from the spirit of this invention as set forth in the appended claims and that in some cases certain features may be used to advantage without a corresponding use of other features.

What is claimed is:

1. A water flow control device comprising; a casing having a passageway extending therethrough, a shoulder in said passageway facing the up-stream side thereof and extending radially inwardly from the side walls thereof, an elastic member seated on said shoulder comprising a base portion with a central opening therein, said opening being at least as large as the opening in the shoulder portion, said base portion having a single flexible neck portion extending upwardly on one side only therefrom, a head portion supported on one side thereof by said neck portion and being otherwise unsupported, said head portion being smaller in diameter than said passageway and moving with increased pressure towards the base portion and thereby restricting the flow of water.

2. A water flow control device comprising; a casing having a passageway extending therethrough, a shoulder in said passageway facing the up-stream side thereof and extending radially inwardly from the side walls thereof, an elastic member seated on said shoulder comprising a base portion with a central opening therein at least as large as the opening in the shoulder portion, said base portion having a single neck portion extending upwardly on one side only therefrom, a head portion supported on one side thereof by said neck portion and being otherwise unsupported, said head portion being smaller in diameter than said passageway, and having a central axial opening therethrough, said head portion moving with increased pressure towards the base portion and thereby restricting the flow of water.

3. A water flow control device comprising: a casing having a passageway extending therethrough, a shoulder in said passageway facing the up-stream side thereof and extending radially inward from the side walls thereof, an elastic member seated on said shoulder comprising a base portion with a central opening therein, said opening being at least as large as the opening in the shoulder portion, said base portion having a single flexible neck portion extending upwardly on one side only therefrom, an overhanging head portion supported on one side thereof by said neck portion and being otherwise unsupported, said head portion being smaller than said passageway and moving with increased pressure toward the base portion and thereby restricting the flow of water.

4. A water flow control device comprising: a casing having a passageway extending therethrough, a shoulder in said passageway facing the up-stream side thereof and extending radially inwardly from the side walls thereof, an elastic member seated on said shoulder comprising a base portion with a central opening therein, said opening being at least as large as the opening in the shoulder portion, said base portion having a single flexible neck portion extending upwardly on one side only therefrom, an overhanging head portion supported on one side thereof by said neck portion and being otherwise unsupported, said base portion fitting snugly in said passageway, said head portion being smaller than said passageway and moving with increased pressure toward the base portion and thereby restricting the flow of water.

5. A water flow control device comprising: a casing having a passageway extending therethrough, a shoulder in said passageway facing the upstream side thereof and extending radially inwardly from the side walls thereof, an elastic member seated on said shoulder comprising a base portion with a central opening therein, said opening being at least as large as the opening in the shoulder portion, said base portion having a single flexible neck portion extending upwardly on one side only therefrom, and extending entirely around the circumference of said passageway, a head portion supported on one side thereof by said neck portion and being otherwise unsupported, said head portion being smaller than said passageway and moving with increased pressure toward the base portion and thereby restricting the flow of water.

6. A water flow control device comprising: a casing having a passageway extending therethrough, a shoulder in said passageway facing the upstream side thereof and extending radially inwardly from the side walls thereof, an elastic member seated on said shoulder comprising a base portion with a central opening therein, said opening being at least as large as the opening in the shoulder portion, said base portion having a single flexible neck portion extending upwardly on one side only therefrom and extending circumferentially through less than 180° of the circumference of said passageway, a head portion supported on one side thereof by said neck portion and being otherwise unsupported, said head portion being smaller than said passageway and moving with increased pressure toward the base portion and thereby restricting the flow of water.

7. A water flow control device comprising: a casing having a passageway extending therethrough, a shoulder in said passageway facing the upstream side thereof and extending radially inwardly from the side walls thereof, an elastic member seated on said shoulder comprising a base portion with a central opening therein, said opening being at least as large as the opening in the shoulder portion, said base portion having a single flexible neck portion extending upwardly on one side only therefrom, a head portion supported on one side thereof by said neck portion and being otherwise unsupported, said head portion being smaller than said passageway and having the free end thereof spaced from the periphery of said passageway when said head portion is under pressure, and moving with increased pressure toward the base portion and thereby restricting the flow of water.

8. A water flow control device comprising: a casing having a passageway extending therethrough, a shoulder in said passageway facing the upstream side thereof and extending radially inwardly from the side walls thereof, an elastic member seated on said shoulder comprising a base portion with a central opening therein, said opening being at least as large as the opening in the shoulder portion, said base portion having a single flexible neck portion extending upwardly on one side only therefrom, a head portion supported on one side thereof by said neck portion and being otherwise unsupported, said head portion being smaller than said passageway and having its sides freely spaced from the periphery of said passageway, and moving with increased pressure toward the base portion and thereby restricting the flow of water.

References Cited in the file of this patent
UNITED STATES PATENTS
2,728,355 Dahl _____ Dec. 27, 1955